United States Patent
Xu et al.

(10) Patent No.: US 10,687,318 B2
(45) Date of Patent: Jun. 16, 2020

(54) COMMUNICATION METHOD, USER EQUIPMENT, AND BASE STATION

(71) Applicant: Huawei Technologies Co., Ltd., Shenzhen, Guangdong (CN)

(72) Inventors: Xiaoying Xu, Shanghai (CN); Xiaoxiao Zheng, Shanghai (CN); Yalin Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/267,768

(22) Filed: Feb. 5, 2019

(65) Prior Publication Data

US 2019/0173647 A1 Jun. 6, 2019

Related U.S. Application Data

(63) Continuation of application No. PCT/CN2017/081837, filed on Apr. 25, 2017.

(30) Foreign Application Priority Data

Aug. 11, 2016 (CN) .......................... 2016 1 0658447

(51) Int. Cl.
*H04W 72/04* (2009.01)
*H04W 72/12* (2009.01)
(Continued)

(52) U.S. Cl.
CPC ....... *H04W 72/0413* (2013.01); *H04L 1/1854* (2013.01); *H04L 5/0051* (2013.01);
(Continued)

(58) Field of Classification Search
CPC ............. H04W 72/04; H04W 72/0406; H04W 72/0413; H04W 72/14; H04W 72/12;
(Continued)

(56) References Cited

U.S. PATENT DOCUMENTS

2012/0051319 A1* 3/2012 Kwon ............... H04W 72/0406
370/329
2013/0182664 A1 7/2013 Chen et al.
(Continued)

FOREIGN PATENT DOCUMENTS

CN 101772039 A 7/2010
CN 102447540 A 5/2012
(Continued)

OTHER PUBLICATIONS

"Analysis and evaluation of extended channel selection," 3GPP TSG RAN WG1 Meeting #61, Montreal, Canada, R1-103361, pp. 1-6, 3rd Generation Partnership Project—Valbonne, France (May 10-14, 2010).
(Continued)

*Primary Examiner* — Ashley Shivers
(74) *Attorney, Agent, or Firm* — Leydig, Voit & Mayer, Ltd.

(57) ABSTRACT

Embodiments of the present disclosure relate to a communication method, user equipment, and a base station. The method includes: selecting, by user equipment, a DMRS from a demodulation reference signal DMRS list; sending, by the user equipment to a base station through a first channel, first data that carries the DMRS; receiving, by the user equipment through a second channel, second data that is sent by the base station and that carries feedback information, where a resource on which the second channel is located is determined based on the DMRS and a resource on which the first channel is located, or receiving, by the user equipment through a second channel, second data that is sent by the base station and that carries information about a resource on which a third channel is located, where a resource on which the second channel is located is determined based on the DMRS and a resource on which the first channel is located, and receiving, by the user equipment
(Continued)

through the third channel, third data that is sent by the base station and that carries feedback information; and determining, by the user equipment, that the feedback information is information fed back by the base station for the first data. In the embodiments of the present disclosure, feedback information of a plurality of user equipments can be distinguished from each other while resource utilization is ensured.

10 Claims, 6 Drawing Sheets

(51) Int. Cl.
*H04L 1/18* (2006.01)
*H04L 5/00* (2006.01)
(52) U.S. Cl.
CPC ......... *H04W 72/04* (2013.01); *H04W 72/121* (2013.01); *H04W 72/1284* (2013.01); *H04W 72/1289* (2013.01)
(58) Field of Classification Search
CPC ......... H04W 72/1205; H04W 72/1278; H04W 72/1284; H04L 2025/03783; H04L 27/261; H04L 5/0051; H04L 1/1854
See application file for complete search history.

(56) References Cited

U.S. PATENT DOCUMENTS

| | | | |
|---|---|---|---|
| 2015/0029972 A1* | 1/2015 | Park | H04L 1/1896 370/329 |
| 2015/0063234 A1* | 3/2015 | Park | H04B 7/024 370/329 |
| 2015/0282123 A1* | 10/2015 | Miao | H04W 48/00 455/450 |
| 2016/0081115 A1 | 3/2016 | Pang et al. | |
| 2017/0302491 A1 | 10/2017 | Yang et al. | |
| 2018/0183556 A1* | 6/2018 | Shin | H04L 5/0051 |

FOREIGN PATENT DOCUMENTS

| | | | | |
|---|---|---|---|---|
| CN | 103002581 A | 3/2013 | | |
| CN | 104380765 A | 2/2015 | | |
| CN | 105634707 A | 6/2016 | | |
| CN | 105812105 A | 7/2016 | | |
| WO | 2014176972 A1 | 11/2014 | | |
| WO | WO-2016204713 A1 * | 12/2016 | ......... | H04W 74/004 |

OTHER PUBLICATIONS

"PCFICH Detection in an eICIC Enabled Heterogeneous Network," 3GPP TSG RAN WG1 Meeting #67, San Francisco, USA, R1-113965, pp. 1-7, 3rd Generation Partnership Project—Valbonne, France (Nov. 14-18, 2011).

* cited by examiner

_US 10,687,318 B2_

COMMUNICATION METHOD, USER EQUIPMENT, AND BASE STATION

CROSS-REFERENCE TO RELATED APPLICATIONS

This application is a continuation of International Application No. PCT/CN2017/081837, filed on Apr. 25, 2017, which claims priority to Chinese Patent Application No. 201610658447.7, filed on Aug. 11, 2016. The disclosures of the aforementioned applications are hereby incorporated by reference in their entireties.

TECHNICAL FIELD

The present application relates to the field of communications technologies, and in particular, to a communication method, user equipment, and a base station.

BACKGROUND

With wide application of intelligent terminals (smart phones) and machine-to-machine (M2M) communication, a growing quantity of small data packets are being transmitted, especially in fields such as smart metering, intelligent transportation, and smart healthcare that are supported by M2M services. Data transmission of the small data packets is regular to an extent. For example, a relatively small amount of data is transmitted each time, and a time interval for data transmission is relatively long. In a Long Term Evolution (LTE) system, data transmission of user equipment (UE) is performed based on scheduling by a base station. To improve resource sending efficiency, UEs in a connected mode may share one or more resources. UEs in an idle mode may share a resource pool.

UE receives, on a downlink physical hybrid automatic repeat request indicator channel (PHICH), feedback information of uplink data sent by the UE, and a PHICH resource is determined based on uplink sending resource information and demodulation reference signal (DMRS) information of the UE. In the LTE system, the base station allocates one DMRS to a plurality of UEs. Therefore, when UEs that have a same DMRS select a same uplink resource, a downlink feedback channel of the UE is not uniquely determined. A plurality of UEs may receive feedback information on a resource of a same PHICH channel at the same time.

In an existing solution, all UEs send, on a fixed downlink feedback resource, feedback information that carries an identity of the UE. However, because the feedback information is carried on the fixed resource, a quantity of UEs that support simultaneous feedback is limited when few resources are reserved, and a resource waste is caused when a lot of resources are reserved.

In another existing solution, a group of UEs in a connected mode are configured, to share one uplink sending resource or a group of uplink sending resources. Feedback information of the group of UEs forms a bitmap. Each UE determines a location of feedback information of the UE in the bitmap based on identification information of the UE, and determines a downlink PHICH resource based on the uplink resource and feedback resource group information. There is no mechanism for determining a PHICH resource by idle UE, and distinguishing between feedback information of different UEs.

It can be learned from the foregoing that in the prior art, a quantity of UEs cannot be flexibly supported while resource utilization is ensured. In the prior art, feedback information of different idle UEs cannot be distinguished from each other.

SUMMARY

Embodiments of the present disclosure provide a communication method, user equipment, and a base station, to resolve prior-art problems that a quantity of UEs cannot be flexibly supported while resource utilization is ensured, and feedback information of different UEs cannot be distinguished from each other.

According to a first aspect, an embodiment of the present disclosure provides a communication method, and the method includes:

selecting, by user equipment, a DMRS from a demodulation reference signal DMRS list; sending, by the user equipment to a base station through a first channel, first data that carries the DMRS; receiving, by the user equipment through a second channel, second data that is sent by the base station and that carries feedback information, where a resource on which the second channel is located is determined based on the DMRS and a resource on which the first channel is located; and determining, by the user equipment, that the feedback information is information fed back by the base station for the first data.

In this embodiment of the present disclosure, the base station determines a feedback channel resource based on the DMRS selected by the user equipment and an uplink resource, so that a quantity of user equipments can be flexibly supported while resource utilization is ensured. The base station scrambles the feedback information of the user equipment by using an identifier of the user equipment, so that feedback information of a plurality of user equipments can be distinguished from each other.

In a possible implementation, the user equipment randomly selects a DMRS from the DMRS list; or the user equipment selects a DMRS from the DMRS list based on identification information of the user equipment.

In a possible implementation, the first data further carries identification information of the user equipment, and the second data further carries the identification information, so that the user equipment determines, based on the identification information in the second data, that the feedback information is the information fed back by the base station for the first data.

In a possible implementation, the first data further carries a sequence number of the first data, and the second data further carries the sequence number, so that the user equipment determines, based on the identification information and the sequence number that are in the second data, that the feedback information is the information fed back by the base station for the first data.

In a possible implementation, that the second data further carries the identification information is specifically: scrambling the second data by using the identification information.

Specifically, the second data is scrambled by using the identification information, so that feedback information of different user equipments can be distinguished from each other.

In a possible implementation, the identification information includes one or more of the following information: a non-access stratum identifier NAS ID, a group-radio network temporary identifier G-RNTI, radio network temporary identifier information C-RNTI unique to the user equipment within a range of one or more cells, and an intra-group index.

According to a second aspect, an embodiment of the present disclosure provides a communication method, and the method includes:

selecting, by user equipment, a DMRS from a demodulation reference signal DMRS list; sending, by the user equipment to a base station through a first channel, first data that carries the DMRS; receiving, by the user equipment through a second channel, second data that is sent by the base station and that carries information about a resource on which a third channel is located, where a resource on which the second channel is located is determined based on the DMRS and a resource on which the first channel is located, and the second channel and the third channel are different from each other; receiving, by the user equipment through the third channel, third data that is sent by the base station and that carries feedback information; and determining, by the user equipment, that the feedback information is information fed back by the base station for the first data.

In this embodiment of the present disclosure, the base station determines a feedback channel resource based on the DMRS selected by the UE and an uplink resource, so that a quantity of UEs can be flexibly supported while resource utilization is ensured. The UE randomly selects a DMRS, and scrambles the feedback information of the UE by using a UE ID. In addition, feedback channel PDSCHs of different UEs or different groups of UEs may be distinguished from each other by using control channel PDCCHs, so that feedback information of different UEs can be distinguished from each other.

In a possible implementation, the user equipment randomly selects a DMRS from the DMRS list; or the user equipment selects a DMRS from the DMRS list based on identification information of the user equipment.

In a possible implementation, the first data further carries identification information of the user equipment, the second data further carries the identification information, and before the receiving, by the user equipment through the third channel, third data that is sent by the base station and that carries feedback information, the method further includes: determining, by the user equipment based on the identification information in the second data, that the third channel is a channel used by the base station to send the feedback information to the user equipment.

In a possible implementation, the third data further carries the identification information, so that the user equipment determines, based on the identification information in the third data, that the feedback information is the information fed back by the base station for the first data.

In a possible implementation, the first data further carries a sequence number of the first data, and the third data further carries the sequence number, so that the user equipment determines, based on the identification information and the sequence number that are in the third data, that the feedback information is the information fed back by the base station for the first data.

Specifically, feedback information of different user equipments may be distinguished from each other by using sequence numbers of first data. Still further, feedback information for different data that is sent by a same user equipment to the base station may be distinguished from each other by using a sequence number of first data.

In a possible implementation, that the second data further carries the identification information is specifically: scrambling the second data by using the identification information.

Specifically, the second data is scrambled by using the identification information, so that feedback channels of different user equipments can be distinguished from each other.

According to a third aspect, an embodiment of the present disclosure provides a communication method, and the method includes:

receiving, by a base station through a first channel, first data that is sent by user equipment and that carries a demodulation reference signal DMRS, determining, by the base station based on the DMRS and a resource on which the first channel is located, a resource on which a second channel is located; and sending, by the base station to the user equipment through the second channel, second data that carries feedback information that is sent by the base station for the first data.

In a possible implementation, the first data further carries identification information of the user equipment, and the second data further carries the identification information, so that the user equipment determines, based on the identification information in the second data, that the feedback information is information fed back by the base station for the first data.

In a possible implementation, that the second data further carries the identification information is specifically: scrambling, by the base station, the second data by using the identification information, and returning scrambled second data to the user equipment through the second channel.

According to a fourth aspect, an embodiment of the present disclosure provides a communication method, and the method includes:

receiving, by a base station through a first channel, first data that is sent by user equipment and that carries a demodulation reference signal DMRS; determining, by the base station based on the DMRS and a resource on which the first channel is located, a resource on which a second channel is located; sending, by the base station to the user equipment through the second channel, second data that carries information about a resource on which a third channel is located, where the second channel and the third channel are different from each other; and sending, by the base station to the user equipment through the third channel, third data that carries feedback information that is sent by the base station for the first data.

In a possible implementation, the first data further carries identification information of the user equipment, and the second data further carries the identification information, so that the user equipment determines, based on the identification information in the second data, that the third channel is a channel used by the base station to send the feedback information to the user equipment.

In a possible implementation, the third data further carries the identification information, so that the user equipment determines, based on the identification information in the third data, that the feedback information is information fed back by the base station for the first data.

According to a fifth aspect, an embodiment of the present disclosure provides user equipment, and the user equipment includes a processor configured to select a DMRS from a demodulation reference signal DMRS list; a transmitter configured to send, to a base station through a first channel, first data that carries the DMRS; and a receiver configured to receive, through a second channel, second data that is sent by the base station and that carries feedback information, where a resource on which the second channel is located is determined based on the DMRS and a resource on which the first channel is located. The processor is also configured to determine that the feedback information is information fed back by the base station for the first data.

In a possible implementation, the selection unit is specifically configured to randomly select a DMRS from the DMRS list; or select a DMRS from the DMRS list based on identification information of the user equipment.

In a possible implementation, the first data further carries identification information of the user equipment, the second data further carries the identification information, and the determining unit is further specifically configured to determine, based on the identification information in the second data, that the feedback information is the information fed back by the base station for the first data.

According to a sixth aspect, an embodiment of the present disclosure provides user equipment, and the user equipment includes a processor configured to select a DMRS from a demodulation reference signal DMRS list; a transmitter configured to send, to a base station through a first channel, first data that carries the DMRS; and a receiver configured to receive, through a second channel, second data that is sent by the base station and that carries information about a resource on which a third channel is located, where a resource on which the second channel is located is determined based on the DMRS and a resource on which the first channel is located, and the second channel and the third channel are different from each other. The receiver is also configured to receive, through the third channel, third data that is sent by the base station and that carries feedback information, and the processor is also configured to determine that the feedback information is information fed back by the base station for the first data.

In a possible implementation, the selection unit is specifically configured to randomly select a DMRS from the DMRS list; or select a DMRS from the DMRS list based on identification information of the user equipment.

In a possible implementation, the first data further carries identification information of the user equipment, the second data further carries the identification information, and the determining unit is further specifically configured to determine, based on the identification information in the second data, that the third channel is a channel used by the base station to send the feedback information to the user equipment.

In a possible implementation, the third data further carries the identification information, and the determining unit is specifically configured to determine, based on the identification information in the third data, that the feedback information is the information fed back by the base station for the first data.

According to a seventh aspect, an embodiment of the present disclosure provides a base station, and the base station includes a receiver configured to receive, through a first channel, first data that is sent by user equipment and that carries a demodulation reference signal DMRS; a processor configured to determine, based on the DMRS and a resource on which the first channel is located, a resource on which a second channel is located; and a transmitter configured to send, to the user equipment through the second channel, second data that carries feedback information that is sent by the base station for the first data.

In a possible implementation, the first data further carries identification information of the user equipment, and the transmitter is specifically configured to send, to the user equipment through the second channel, the second data that further carries the identification information, so that the user equipment determines, based on the identification information in the second data, that the feedback information is information fed back by the base station for the first data.

In a possible implementation, the processor is configured to scramble the second data by using the identification information, so that the second data further carries the identification information.

According to an eighth aspect, an embodiment of the present disclosure provides a base station, and the base station includes a receiver configured to receive, through a first channel, first data that is sent by user equipment and that carries a demodulation reference signal DMRS; a processor configured to determine, based on the DMRS and a resource on which the first channel is located, a resource on which a second channel is located; and a transmitter configured to send, to the user equipment through the second channel, second data that carries information about a resource on which a third channel is located, where the second channel and the third channel are different from each other, and configured to send, to the user equipment through the third channel, third data that carries feedback information that is sent by the base station for the first data.

In a possible implementation, the first data further carries identification information of the user equipment, and the transmitter is specifically configured to send, to the user equipment through the second channel, the second data that further carries the identification information, so that the user equipment determines, based on the identification information in the second data, that the third channel is a channel used by the base station to send the feedback information to the user equipment.

In a possible implementation, the processor is configured to scramble the second data by using the identification information, so that the second data further carries the identification information.

In a possible implementation, the second sending unit is specifically configured to send, to the user equipment through the third channel, the third data that further carries the identification information, so that the user equipment determines, based on the identification information in the third data, that the feedback information is information fed back by the base station for the first data.

According to a ninth aspect, an embodiment of the present disclosure provides user equipment, and the user equipment includes a processor, a transmitter, and a receiver. The processor is configured to select a DMRS from a demodulation reference signal DMRS list. The transmitter is configured to send, to a base station through a first channel, first data that carries the DMRS. The receiver is configured to receive, through a second channel, second data that is sent by the base station and that carries feedback information, where a resource on which the second channel is located is determined based on the DMRS and a resource on which the first channel is located. The processor is further configured to determine that the feedback information is information fed back by the base station for the first data.

In a possible implementation, the processor is specifically configured to randomly select a DMRS from the DMRS list; or select a DMRS from the DMRS list based on identification information of the user equipment.

In a possible implementation, the first data further carries identification information of the user equipment, the second data further carries the identification information, and the processor is specifically configured to determine, based on the identification information in the second data, that the feedback information is the information fed back by the base station for the first data.

According to a tenth aspect, an embodiment of the present disclosure provides user equipment, and the user equipment includes a processor, a transmitter, and a receiver. The processor is configured to select a DMRS from a demodulation reference signal DMRS list. The transmitter is configured to send, to a base station through a first channel, first data that carries the DMRS. The receiver is configured to receive, through a second channel, second data that is sent by the base station and that carries information about a resource on which a third channel is located, where a resource on which the second channel is located is determined based on the DMRS and a resource on which the first channel is located, and the second channel and the third channel are different from each other. The receiver is further configured to receive, through the third channel, third data that is sent by the base station and that carries feedback information. The processor is further configured to determine that the feedback information is information fed back by the base station for the first data.

In a possible implementation, the processor is specifically configured to randomly select a DMRS from the DMRS list; or select a DMRS from the DMRS list based on identification information of the user equipment.

In a possible implementation, the first data further carries identification information of the user equipment, the second data further carries the identification information, and the processor is specifically configured to determine, based on the identification information in the second data, that the third channel is a channel used by the base station to send the feedback information to the user equipment.

In a possible implementation, the third data further carries the identification information, and the processor is specifically configured to determine, based on the identification information in the third data, that the feedback information is the information fed back by the base station for the first data.

According to an eleventh aspect, an embodiment of the present disclosure provides a base station, and the base station includes a receiver, a processor, and a transmitter. The receiver is configured to receive, through a first channel, first data that is sent by user equipment and that carries a demodulation reference signal DMRS. The processor is configured to determine, based on the DMRS and a resource on which the first channel is located, a resource on which a second channel is located. The transmitter is configured to send, to the user equipment through the second channel, second data that carries feedback information that is sent by the base station for the first data.

In a possible implementation, the first data further carries identification information of the user equipment, and the transmitter is specifically configured to send, to the user equipment through the second channel, the second data that further carries the identification information, so that the user equipment determines, based on the identification information in the second data, that the feedback information is information fed back by the base station for the first data.

In a possible implementation, the processor is specifically configured to scramble the second data by using the identification information, so that the second data further carries the identification information.

According to a twelfth aspect, an embodiment of the present disclosure provides a base station, and the base station includes a receiver, a processor, and a transmitter. The receiver is configured to receive, through a first channel, first data that is sent by user equipment and that carries a demodulation reference signal DMRS. The processor is configured to determine, based on the DMRS and a resource on which the first channel is located, a resource on which a second channel is located. The transmitter is configured to send, to the user equipment through the second channel, second data that carries information about a resource on which a third channel is located, where the second channel and the third channel are different from each other. The transmitter is further configured to send, to the user equipment through the third channel, third data that carries feedback information that is sent by the base station for the first data.

In a possible implementation, the first data further carries identification information of the user equipment, and the transmitter is specifically configured to send, to the user equipment through the second channel, the second data that further carries the identification information, so that the user equipment determines, based on the identification information in the second data, that the third channel is a channel used by the base station to send the feedback information to the user equipment.

In a possible implementation, the transmitter is specifically configured to send, to the user equipment through the third channel, the third data that further carries the identification information, so that the user equipment determines, based on the identification information in the third data, that the feedback information is information fed back by the base station for the first data.

In a possible implementation, the processor is specifically configured to scramble the second data by using the identification information, so that the second data further carries the identification information.

Based on the foregoing technical solutions, according to the communication method, the user equipment, and the base station that are provided in the embodiments of the present disclosure, a quantity of user equipments can be flexibly supported while resource utilization is ensured, and information fed back by the base station for different UEs can be distinguished from each other.

DESCRIPTION OF EMBODIMENTS

The technical solutions according to embodiments of the present disclosure are clearly and completely described in the following with reference to the accompanying drawings. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

A network architecture and a service scenario that are described in the embodiments of the present disclosure are used to describe the technical solutions in the embodiments of the present disclosure more clearly, but are not intended to limit the technical solutions provided in the embodiments of the present disclosure. A person of ordinary skill in the art may learn that with evolution of the network architecture and emergence of a new service scenario, the technical solutions provided in the embodiments of the present disclosure are also applicable to a similar technical problem.

Figure 1:
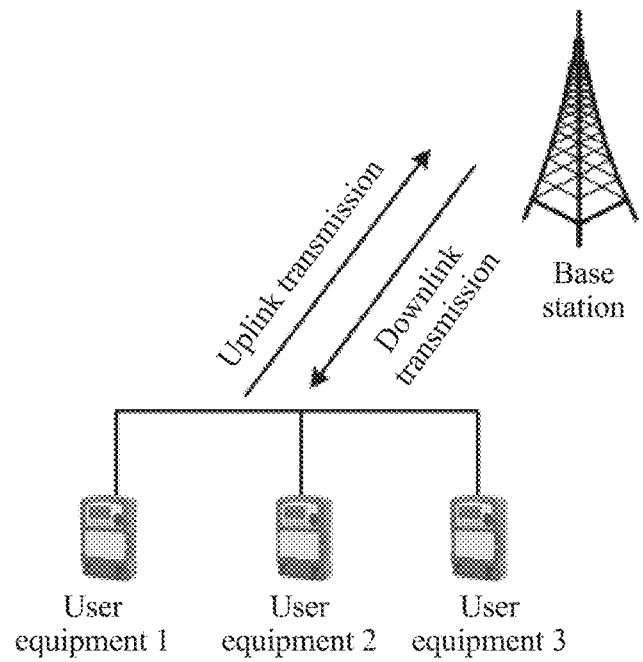
FIG. 1 is a schematic diagram of a system according to an embodiment of the present disclosure.

As shown in FIG. 1, user equipment UE communicates with another terminal or another user equipment by using a base station. Wireless communication is performed between the base station and the UE for uplink transmission and downlink transmission. When sending information to the base station, the UE uses an uplink resource for transmission; and when sending an instruction/information to the UE, the base station uses a downlink resource for transmission. UE 1, UE 2, and UE 3 may share one uplink or downlink resource. For example, the UE 1 and the UE 2 share an uplink resource, and the UE 2 and the UE 3 share a downlink resource; or the UE 1, the UE 2, and the UE 3 share uplink and downlink resources.

UEs in a connected mode may share one or more resources. UEs in an idle (idle) mode may share a resource pool. The UE may select an uplink resource, or the base station may configure an uplink resource for the UE. After the UE sends uplink data to the base station, the base station returns feedback information for the uplink data to the UE by using a downlink resource. The downlink resource is determined by the base station based on DMRS information of the UE and uplink resource information.

It should be noted that more or fewer UEs may be included in FIG. 1. The UE 1, the UE 2, and the UE 3 shown in FIG. 1 are only used to describe an application scenario in the embodiments of the present disclosure, and do not constitute a limitation on a quantity of UEs.

The technology described in the embodiments of the present disclosure may be applied to a Long Term Evolution (LTE) system or other wireless communications systems that use various radio access technologies, for example, systems that use access technologies such as Wideband Code Division Multiple Access (WCDMA), Frequency Division Multiple Access (FDMA), Time Division Multiple Access (TDMA), orthogonal frequency division multiple access (OFDMA), and single carrier frequency division multiple access (SC-FDMA). In addition, the technology may also be applied to a subsequent evolved system of the LTE system, for example, a 5th generation 5G system of the LTE system. For clarity, the LTE system is used only as an example herein for description.

In the embodiments of the present disclosure, nouns "network" and "system" are usually interchangeably used, but meanings of the nouns may be understood by a person skilled in the art. The UE in the embodiments of the present disclosure may include various devices that have a wireless communication function, or other processing devices connected to a wireless modem. For ease of description, the devices mentioned above are collectively referred to as a terminal in the embodiments of the present disclosure. The base station (BS) in the embodiments of the present disclosure is an apparatus that is deployed in a radio access network and that is configured to provide a wireless communication function for a terminal. The base station may include macro base stations, micro base stations, relay nodes, access points, and the like in various forms. In systems that use different radio access technologies, devices with a base station function may have different names. For example, the device is referred to as an evolved NodeB (evolved NodeB, eNB or eNodeB) in an LTE network, and the device is referred to as a NodeB (Node B) in a 3rd generation 3G network, or the like. For ease of description, in this application, the foregoing apparatuses that provide the wireless communication function for the UE are collectively referred to as the base station or BS.

Resources in the embodiments of the present disclosure may include resources of a physical uplink control channel (PUCCH), a physical uplink shared channel (PUSCH), a physical downlink control channel (PDCCH), a physical downlink shared channel (PDSCH), a PHICH channel, and another common channel.

According to a communication method provided in an embodiment of the present disclosure, UE selects a piece of DMRS information from a DMRS information list. In this case, resource utilization can be ensured. For example, for a group of UEs that use a same uplink resource to send data, each UE autonomously selects a DMRS; therefore, a probability that the group of UEs have a same DMRS is reduced. A downlink resource is determined based on the DMRS information of the UE and the uplink resource. Therefore, a probability that the UEs have a same downlink resource is also correspondingly reduced. Compared with an existing channel sharing solution in which downlink data is carried on a fixed downlink feedback resource, a quantity of UEs can be flexibly supported while resource utilization is ensured in the solution provided in this embodiment of the present disclosure.

Figure 2:
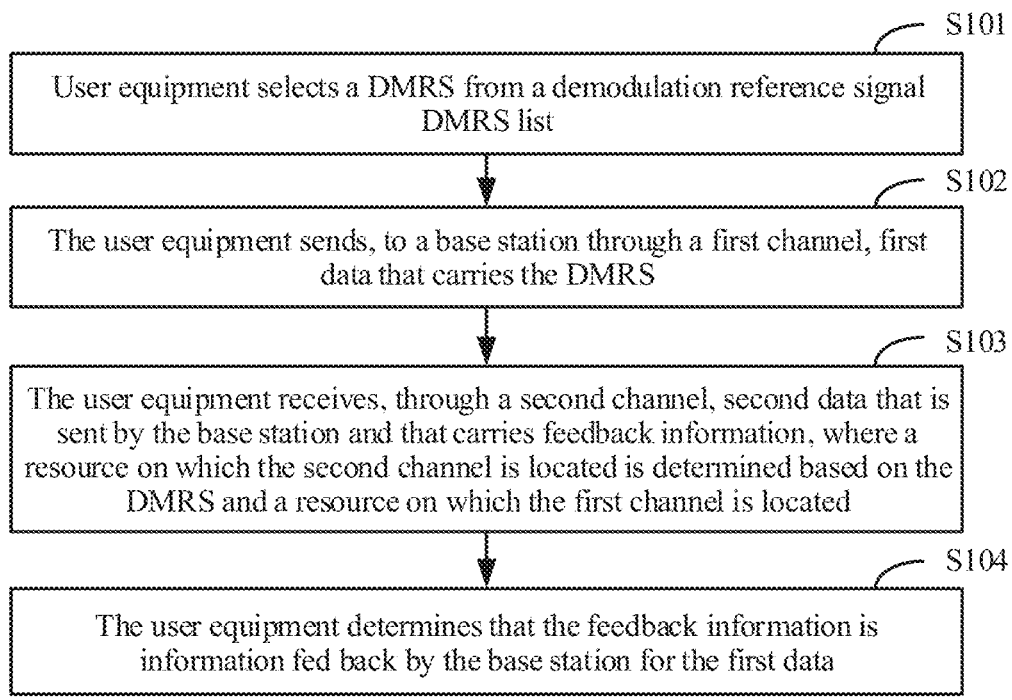
FIG. 2 is a flowchart of a communication method according to an embodiment of the present disclosure.

The solutions provided in the embodiments of the present disclosure are described in detail below with reference to FIG. 2. FIG. 2 is a flowchart of a communication method according to an embodiment of the present disclosure. In this embodiment of the present disclosure, the method is performed by UE. As shown in FIG. 2, the embodiment includes the following steps.

Step S101. The user equipment selects a DMRS from a demodulation reference signal DMRS list.

Preferably, the user equipment randomly selects a DMRS from the DMRS list or the user equipment selects a DMRS from the DMRS list based on identification information of the user equipment.

Specifically, the user equipment may randomly select a DMRS from the DMRS list. The DMRS list may be sent by a base station, or may be agreed on by the terminal and the base station by using a protocol.

Specifically, the user equipment selects a DMRS from the DMRS list based on the identification information of the user equipment. The user equipment selects a DMRS based on a value obtained after a modulo operation is performed on an identifier of the user equipment. The value obtained after a modulo operation is performed on the identifier of the user equipment is N, and N is a positive integer. There is a preset correspondence between N and a DMRS. The correspondence may be a one-to-one correspondence, or may be a one-to-many correspondence. In addition, if N corresponds to many DMRSs, the user equipment randomly selects a DMRS from the DMRSs corresponding to the value N obtained after a modulo operation is performed on the identifier of the user equipment.

Step S102. The user equipment sends, to a base station through a first channel, first data that carries the DMRS.

Specifically, a resource of the first channel may be one of one or more PUCCH and/or PUSCH channel resources configured by a network for the UE. It may be understood that the resource of the first channel is an uplink resource.

It should be noted that a resource used by the first channel is not selected through scheduling. For example, the resource is pre-allocated or scheduled in advance. When user equipments share one or more resources, the user equipment directly selects a resource (channel) for transmission, and does not need to request the network to schedule and allocate a resource.

Optionally, when sending data and a DMRS sequence of the UE, the UE further sends the identification information that indicates the DMRS selected by the UE. For example, the UE sends, on a dedicated resource (or a dedicated channel) allocated by a network, the identification information that indicates the DMRS selected by the UE, or the UE may add, to previous several symbols of the sent data, the identification information that indicates the DMRS selected by the UE. The base station learns of, from the dedicated resource/channel or a data resource, information about the DMRS used by the UE, and then performs evaluation and demodulation on a data channel based on the indicated DMRS sequence sent by the UE.

Preferably, the first data further carries identification information of the user equipment.

Preferably, the identification information includes one or more of the following information: a non-access stratum identifier NAS ID, a group-radio network temporary identifier G-RNTI, radio network temporary identifier information C-RNTI unique to the user equipment within a range of one or more cells, and an intra-group index.

Specifically, an identity (Identity, ID) of the UE includes identification information such as a group-radio network temporary identifier (G-RNTI), unique radio network temporary identifier information (C-RNTI) of user equipment within a range of one or more cells, a non-access stratum identifier (NAS ID), an intra-group index, an international mobile equipment identity (IMEI), or an international mobile subscriber identity (IMSI). The non-access stratum identifier NAS ID may be a unique identifier of the UE, such as a P-TMSI (Packet Temporary Mobile Subscriber Identity), an S-TMSI (SAE-Temporary Mobile Subscriber Identity), a MAC (Media Access Control) address, or an IP address.

In an example, idle UE indicates a list of optional uplink resources and a list of information about allowed DMRSs by using a system broadcast message. During uplink sending, the idle UE separately selects an uplink resource and a DMRS to perform uplink sending. Information that is sent includes a UE ID, and the UE randomly selects a DMRS or selects a DMRS based on the UE ID.

When the idle UE needs to send a data packet, the idle UE does not need to establish a radio resource control protocol (RRC) connection, but selects a resource from shared resources of the idle UE by using a default or preconfigured data bearer, and directly sends data on the resource. UE in a connected mode may directly transmit data on a shared resource, and does not need to request for scheduling either.

Step S103. The user equipment receives, through a second channel, second data that is sent by the base station and that carries feedback information, where a resource on which the second channel is located is determined based on the DMRS and a resource on which the first channel is located.

The base station determines a sending resource of a downlink feedback channel based on the uplink resource of the UE, an identifier corresponding to the DMRS, and the like. The downlink feedback channel is the second channel. The UE receives, through the second channel, the second data that is sent by the base station and that carries the feedback information.

It should be noted that the UE and the base station may agree on, according to a protocol, a sending resource of a downlink feedback channel PHICH determined based on the uplink resource of the UE, the identifier corresponding to the DMRS, and the like. After sending uplink data, the UE receives the feedback information on a downlink resource determined based on the uplink resource and the DMRS.

In addition, a PDCCH channel may alternatively be used as a downlink channel. The downlink channel is the second channel, or may be referred to as a feedback channel. For example, a new format may be designed to share a physical downlink control channel such as a PDCCH. Alternatively, a newly designed dedicated feedback channel such as an extended PHICH is used.

In an example, the UE receives, through the PHICH channel, feedback information scrambled by using the UE ID. After receiving the feedback information, the UE performs descrambling by using the UE ID and performs verification. If the verification succeeds, it is determined that the feedback information is information fed back by the base station for the first data sent by the UE.

In another example, the UE receives, through the PDCCH channel, feedback information scrambled by using the UE ID. After receiving the feedback information, the UE performs descrambling by using the UE ID and performs verification. If the verification succeeds, it is determined that the feedback information is information fed back by the base station for the first data sent by the UE.

It should be noted that whether the PHICH or the PDCCH channel is specifically used as the downlink channel may be agreed on by the base station and the UE by using a protocol. In a communication process, the scrambled feedback information is directly sent through the downlink channel that has been agreed on.

Specifically, for example, the feedback channel is the PHICH channel, and a resource location of a PHICH channel has a timing offset relative to a location of an uplink sending resource. For example, the timing offset in frequency division duplexing (FDD) is +4 relative to the location of the uplink sending resource. In addition, the timing offset may also be configuration-based. In other words, a timing offset between a subframe of the feedback channel and an uplink sending subframe may be fixed or configuration-based. Optionally, a feedback timing offset may have a range. For example, the timing offset is N+3 to N+5 subframes after the sending subframe.

It should be noted that UE with connected discontinuous reception or in an inactive mode has a unique air interface ID in a plurality of cells. After a cell change, the UE initiates a mobility process such as cell reselection. After the UE moves out of a cell ID range, the UE initiates location update to obtain a new air interface identifier. The network configures a group of users to share a group of uplink sending resources or one uplink sending resource, and the network configures (it is agreed on by using a protocol) to send a list of information about allowed DMRSs to the UE or the base station sends a list of information about allowed DMRSs to the UE. When a group of uplink resources is shared, the UE selects a resource and a piece of DMRS information to perform uplink sending, and then determines, based on the uplink resource and a DMRS, a resource for receiving a feedback channel. If one uplink resource is shared, the UE selects a piece of DMRS information for sending, and determines, based on the uplink resource and a DMRS, a resource for receiving a feedback channel.

Step S104. The user equipment determines that the feedback information is information fed back by the base station for the first data.

Preferably, the first data further carries the UE ID, and the second data further carries the UE ID, so that the UE determines, based on the UE ID in the second data, that the feedback information is the information fed back by the base station for the first data.

Preferably, that the second data further carries the UE ID is specifically: scrambling the second data by using the UE ID.

In an example, the feedback information of the UE is scrambled on a PHICH feedback channel by using the UE ID, and after receiving the feedback information, the UE performs descrambling by using the UE ID and performs verification. If the verification succeeds, it is determined that the feedback information is the information fed back by the base station for the first data sent by the UE.

It may be understood that the feedback channel is scrambled by using a unique identifier of the UE. For example, the feedback information is scrambled by using the C-RNTI.

It may be understood that when the UE sends data to the base station, for example, when a metering device sends metering data to the base station, the base station forwards the metering data to the terminal. When sending the data, the UE may send one or more UE IDs to the base station at the same time. For example, the UE may send, to the base station, data and the UE ID such as the C-RNTI, the intra-group index, and/or the G-RNTI that need to be sent to a peer terminal. After receiving the data of the UE, the base station needs to return feedback information to the UE. For example, an acknowledgement (ACK) indicates that the sending succeeds, and a NACK indicates that the sending fails. The base station may scramble the feedback information of the UE by using the G-RNTI and the intra-group index, or may scramble the feedback information of the UE by using the C-RNTI, or may scramble the feedback information of the UE by using the intra-group index, or the like.

Further, for the PHICH feedback channel, optionally, an unscrambled part of the PHICH feedback channel is used to indicate whether some content is scrambled by using the UE ID. In other words, the second data may further carry information that indicates whether the second data carries the UE ID.

Preferably, the first data further carries a sequence number of the first data, and the second data further carries the sequence number, so that the user equipment determines, based on the identification information and the sequence number that are in the second data, that the feedback information is the information fed back by the base station for the first data.

Specifically, the first data may be transmitted at a layer such as a MAC layer, a Radio Link Control (RLC) layer, or a Packet Data Convergence Protocol (PDCP) layer. Therefore, the sequence number of the first data may be a sequence number of a data packet of the first data at a layer such as the MAC layer, the RLC layer, or the PDCP layer.

In an example, the UE may send data to the base station more than once, where a sequence number of the data may be carried by using the data sent by the UE to the base station, and feedback information returned by the base station carries the corresponding sequence number, so that different data sent by the UE to the base station is distinguished from each other. For example, the UE sends data 1 to the base station at a moment 1, and sends data 2 to the base station at a moment 2. The UE receives, at a moment 3, feedback information 1 sent by the base station, and receives, at a moment 4, feedback information 2 sent by the base station. The data 1 and the data 2 that are sent by the UE to the base station may further carry sequence numbers of the corresponding data, and the UE may distinguish the feedback information for the data 1 from the feedback information for the data 2 based on the sequence numbers carried in the feedback information 1 and the feedback information 2.

In addition, the communication method provided in this embodiment of the present disclosure may be performed by a base station. Specific steps are as follows: The base station receives, through a first channel, first data that is sent by user equipment and that carries a demodulation reference signal DMRS. The base station determines, based on the DMRS and a resource on which the first channel is located, a resource on which a second channel is located. The base station sends, to the user equipment through the second channel, second data that carries feedback information that is sent by the base station for the first data.

Preferably, the first data further carries identification information of the user equipment, and the second data further carries the identification information, so that the user equipment determines, based on the identification information in the second data, that the feedback information is information fed back by the base station for the first data.

Preferably, that the second data further carries the identification information is specifically: scrambling, by the base station, the second data by using the identification information, and returning scrambled second data to the user equipment through the second channel.

According to the communication method provided in this embodiment of the present disclosure, the downlink resource is related to uplink resource information and the DRMS. The user equipment may randomly select a DRMS, so that a quantity of UEs can be flexibly supported while resource utilization is ensured. When sending the feedback information to the UE, the base station scrambles the feedback information of the UE by using the UE ID, so that feedback information of the different UEs is distinguished from each other. Further, the sequence number of the corresponding data may be carried in the feedback information for the data sent by the UE, so that feedback information for different data sent by the UE is distinguished from each other.

Figure 3:
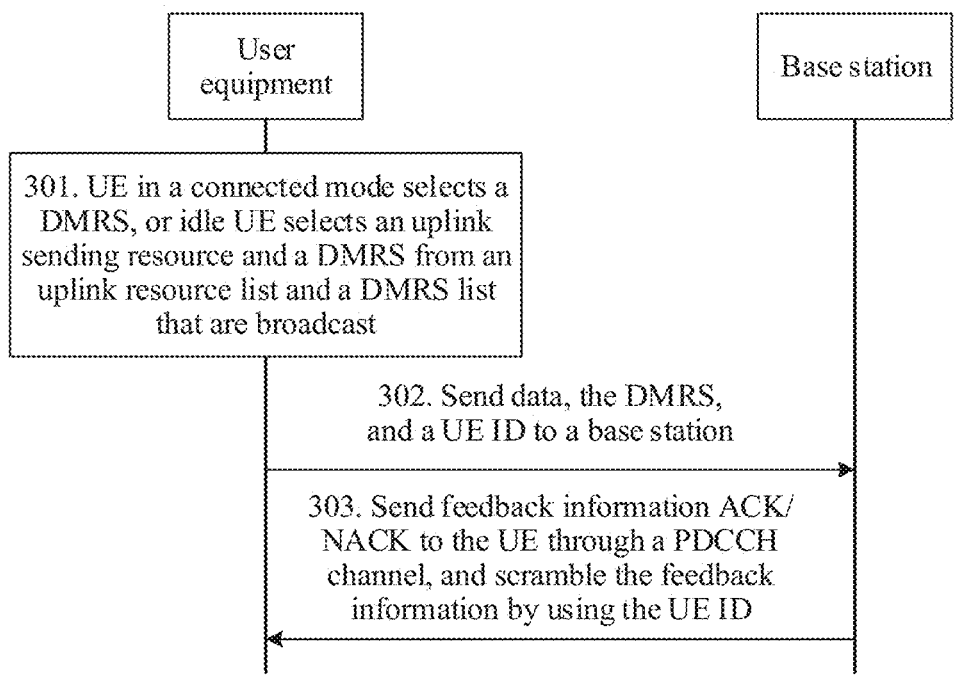
FIG. 3 is a diagram of signaling exchange in a communication method according to an embodiment of the present disclosure.

Correspondingly, an embodiment of the present disclosure provides a diagram of signaling exchange in a communication method, to describe the foregoing communication method in a signaling exchange manner, as shown in FIG. 3.

Step 301. UE in a connected mode selects a DMRS, or idle UE selects an uplink sending resource and a DMRS from an uplink resource list and a DMRS list that are broadcast.

It should be noted that before step 301, for the UE in the connected mode, a network configures, for the UE, a G-RNTI, an intra-group index, a C-RNTI, a NAS ID, a list of available DRMSs, and an uplink grant uplink grant that indicate the UE. A PDCCH in a new format is configured for the UE to send feedback information, and the feedback information includes information such as a format type, the G-RNTI, or an ACK or NCK.

It should be noted that before step 301, for the idle UE, the network configures a NAS ID for the UE. In a process in which the UE sends data to a base station, the NAS ID may be carried as a unique identifier of the UE.

It should be noted that before step 301, for UE with connected discontinuous reception or in an inactive mode, when the UE performs uplink data transmission again, a UE ID allocated to the UE by a network to which the UE is previously connected may be used. Alternatively, for UE with connected discontinuous reception or in an inactive mode, when the UE moves out of a range in which the UE ID is effective, the UE may re-establish a connection to a network, and the network re-allocates a UE ID for the UE.

Specifically, information such as the G-RNTI, the intra-group index, the NAS ID, or the C-RNTI is a UE ID (identification information of the UE).

In an example, the idle UE selects the uplink sending resource and/or the DMRS from a broadcast to transmit data. Specifically, an uplink sending resource broadcast by the idle UE is a resource in a resource pool of the idle UE.

In another example, the network configures a plurality of UE in a connected mode to share one resource, and the UE in the connected mode selects a DMRS from a broadcast DRMS list, and transmits data by using the shared resource of the UE.

It should be noted that the UE randomly selects a DMRS or selects a DMRS based on a UE ID.

Step 302. The UE sends data, the DMRS, and information about a UE ID to a base station.

Specifically, when the UE sends uplink data, the UE ID is carried, where the G-RNTI indicates a number of the UE in a group, and a value of the number depends on a quantity of users in the group.

Step 303. The base station sends feedback information ACK/NACK to the UE through a PDCCH channel, and scrambles the feedback information by using the UE ID.

The base station sends, in n subframes (a timing offset) after an uplink sending subframe, the feedback information by using a downlink resource PDCCH in a new format, and the feedback information includes a format type and an ACK or an NCK, and is scrambled by using the UE ID. The base station selects, based on a resource group and/or an identifier corresponding to the DRMS that are/is sent by the UE, a sending resource of the PDCCH/an enhanced PDCCH (ePDCCH). The UE determines, based on a resource group ID, a resource location of the feedback channel PDCCH/ePDCCH.

In an example, the base station determines a sending resource of a downlink control channel based on uplink resource information and the DRMS, and indicates a number of the UE in the group and an ACK or NCK by using the physical downlink control channel. In a manner, a bitmap may be used to indicate the ACK or NCK at a number location of the UE. In an optional implementation, the number of the UE in the group is sent on the determined control channel only when the feedback information is an ACK, and ACK or NCK information is not sent. The UE determines a receiving channel resource by using a same method, and determines, based on the number, whether the feedback information is feedback information sent to the UE.

In another example, an identifier of the UE is indicated when the data is sent. For example, a unique radio network temporary identifier RNTI of UE in a connected mode may be unique within a range of one or more cells. It may be understood that when the unique radio network temporary identifier RNTI of the UE is unique within a range of one cell, the unique radio network temporary identifier RNTI is a C-RNTI. After the base station determines, based on uplink sending resource information and the DRMS, a resource for sending the feedback channel, the feedback information carries an ACK or NCK, and is scrambled by using the unique RNTI of the UE. In an optional implementation, only a feedback type bit is sent on the determined control channel only when the feedback information is an ACK, and ACK or NCK information is not sent.

In still another example, a group identifier G-RNTI of the UE is indicated when the data is sent. After the base station determines a resource for sending the feedback channel, the feedback information carries an ACK or NCK and an intra-group index of the UE, and is scrambled by using the G-RNTI. The G-RNTI may be sent implicitly. If a group of users shares one uplink resource, there may be a mapping relationship between a G-RNTI and an uplink resource. The base station may determine, based on the uplink resource, G-RNTI information sent by the UE.

It may be understood that if a plurality of UEs are configured to use a group of uplink resources, before sending data, the UE may select, from the group of uplink resources, an uplink sending resource, for example, two physical resource blocks (PRB) or two resource blocks (RB). A resource use granularity may be configured by the network for the UE, or may be agreed on in a protocol. Each resource granularity corresponds to a number, and this number may be a number initially agreed on or a number notified to the UE by the network.

It should be noted that in step 302, the data sent by the UE to the base station may further include a sequence number of the data. For feedback information sent by the base station for a specific piece of data of the UE, a sequence number of the data may also be carried in the feedback information, so that feedback information for different data sent by same UE at different moments or at a same moment is distinguished from each other.

For example, the base station may send feedback information to the UE at a specific frequency, but not send feedback information to the UE each time the UE sends data. Therefore, the feedback information data sent by the base station to the UE may include not only feedback information of different UEs, but also feedback information for different data of same UE. According to the communication method provided in this embodiment of the present disclosure, feedback information of different UEs may be distinguished from each other by performing scrambling by using a UE ID. In addition, a sequence number of data may be carried, for example, feedback information for different data of same UE may be distinguished from each other by performing scrambling by using the sequence number of the data.

According to the communication method provided in this embodiment of the present disclosure, the UE determines a feedback channel resource based on the DMRS selected by the UE and the uplink resource, so that a quantity of UEs can be flexibly supported while resource utilization is ensured. The base station scrambles the feedback information of the UE by using the identifier of the UE, so that feedback information of a plurality of UEs can be distinguished from each other.

Figure 4:
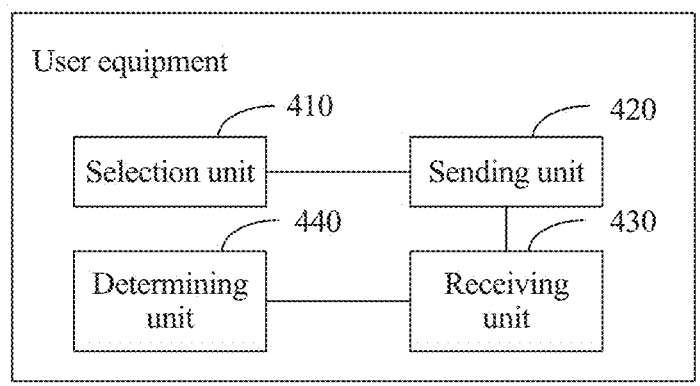
FIG. 4 is a schematic structural diagram of user equipment according to an embodiment of the present disclosure.

Each method described in the foregoing embodiment is a method in which feedback information of different UEs can be distinguished from each other while resource utilization is ensured. Correspondingly, an embodiment of the present disclosure provides user equipment, to implement the foregoing communication method. As shown in FIG. 4, the user equipment includes a selection unit 410, a sending unit 420, a receiving unit 430, and a determining unit 440.

The selection unit 410 is configured to select a DMRS from a demodulation reference signal DMRS list.

The sending unit 420 is configured to send, to a base station through a first channel, first data that carries the DMRS.

The receiving unit 430 is configured to receive, through a second channel, second data that is sent by the base station and that carries feedback information, where a resource on which the second channel is located is determined based on the DMRS and a resource on which the first channel is located.

The determining unit 440 is configured to determine that the feedback information is information fed back by the base station for the first data.

Preferably, the selection unit 410 is specifically configured to randomly select a DMRS from the DMRS list; or select a DMRS from the DMRS list based on identification information of the user equipment.

Preferably, the first data further carries identification information of the user equipment UE ID, and the second data further carries the UE ID. The determining unit 440 is specifically configured to determine, based on the identification information in the second data, that the feedback information is the information fed back by the base station for the first data.

Preferably, that the second data further carries the UE ID is specifically: scrambling the second data by using the UE ID.

Figure 5:
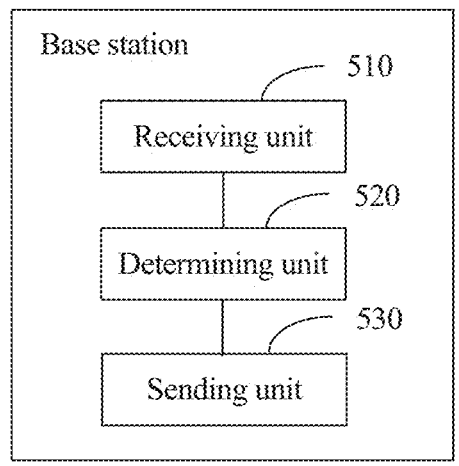
FIG. 5 is a schematic structural diagram of a base station according to an embodiment of the present disclosure.

Correspondingly, an embodiment of the present disclosure provides a base station, to implement the foregoing communication method. As shown in FIG. 5, the base station includes a receiving unit 510, a determining unit 520, and a sending unit 530.

The receiving unit 510 is configured to receive, through a first channel, first data that is sent by user equipment and that carries a demodulation reference signal DMRS.

The determining unit 520 is configured to determine, based on the DMRS and a resource on which the first channel is located, a resource on which a second channel is located.

The sending unit 530 is configured to send, to the user equipment through the second channel, second data that carries feedback information that is sent by the base station for the first data.

Specifically, the first data further carries identification information of the user equipment. The sending unit 530 is specifically configured to send, to the user equipment through the second channel, the second data that further carries the identification information, so that the user equipment determines, based on the identification information in the second data, that the feedback information is information fed back by the base station for the first data.

Specifically, the first data further carries a sequence number of the first data. The sending unit 530 is further specifically configured to send, to the user equipment through the second channel, the second data that further carries the identification information and/or the sequence number, so that the user equipment determines, based on the identification information and/or the sequence number in the second data, that the feedback information is the information fed back by the base station for the first data.

Figure 6:
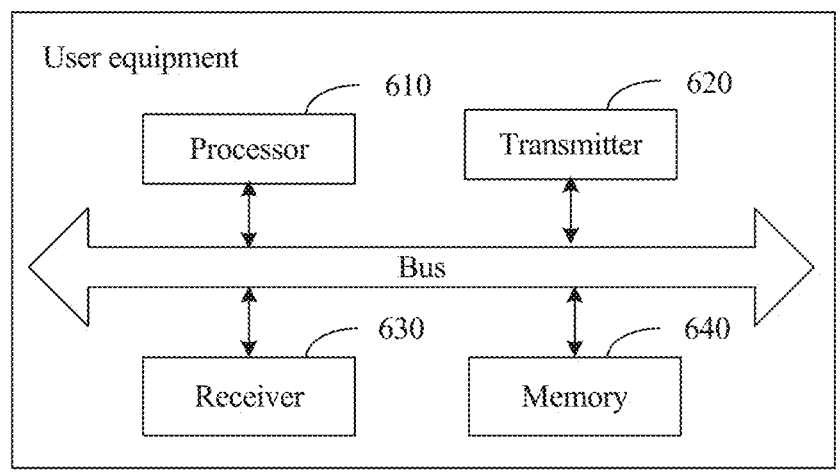
FIG. 6 is a schematic structural diagram of another user equipment according to an embodiment of the present disclosure.

In addition, the user equipment provided in the embodiment of the present disclosure may further use the following implementation, to implement the communication method in the foregoing embodiment of the present disclosure. As shown in FIG. 6, the user equipment includes a processor 610, a transmitter 620, a receiver 630, and a memory 640.

The processor 610 is configured to select a DMRS from a demodulation reference signal DMRS list.

The transmitter 620 is configured to send, to a base station through a first channel, first data that carries the DMRS.

The receiver 630 is configured to receive, through a second channel, second data that is sent by the base station and that carries feedback information, where a resource on which the second channel is located is determined based on the DMRS and a resource on which the first channel is located.

The processor 610 is further configured to determine that the feedback information is information fed back by the base station for the first data.

The processor 610 is specifically configured to randomly select a DMRS from the DMRS list; or select a DMRS from the DMRS list based on identification information of the user equipment.

The memory 640 is configured to store data, a program, and protocol information, and the processor 610 runs the program in the memory 640 to perform the communication method shown in FIG. 2 or FIG. 3.

Preferably, the first data further carries identification information of the user equipment UE ID, and the second data further carries the UE ID. The processor 610 is specifically configured to determine, based on the identification information in the second data, that the feedback information is the information fed back by the base station for the first data.

It may be understood that FIG. 6 shows only a simplified design of the user equipment. In actual application, the user equipment may include any quantity of transmitters, receivers, processors, controllers, memories, and the like, and all base stations that can implement the present disclosure fall within the protection scope of the present disclosure.

Figure 7:
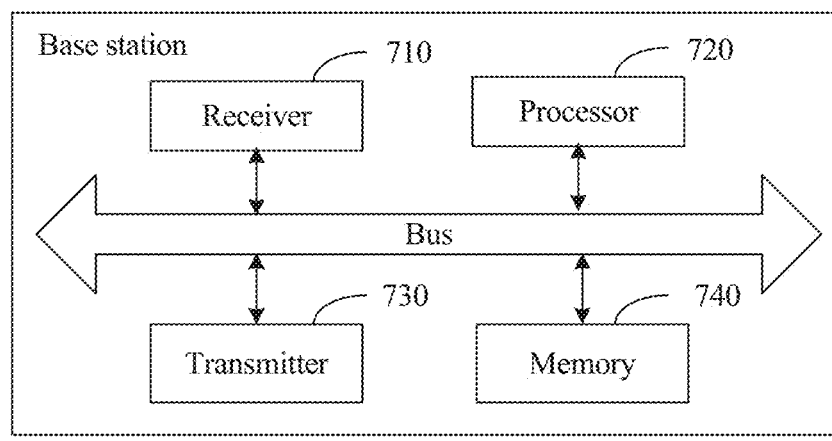
FIG. 7 is a schematic structural diagram of another base station according to an embodiment of the present disclosure.

In addition, the base station provided in the embodiment of the present disclosure may further use the following implementation, to implement the communication method in the foregoing embodiment of the present disclosure. As shown in FIG. 7, the base station includes a receiver 710, a processor 720, a transmitter 730, and a memory 740.

The receiver 710 is configured to receive, through a first channel, first data that is sent by user equipment and that carries a demodulation reference signal DMRS.

The processor 720 is configured to determine, based on the DMRS and a resource on which the first channel is located, a resource on which a second channel is located.

The transmitter 730 is configured to send, to the user equipment through the second channel, second data that carries feedback information that is sent by the base station for the first data.

The memory 740 is configured to store data, a program, and protocol information, and the processor 720 runs the program in the memory 740 to perform the communication method shown in FIG. 2 or FIG. 3.

Preferably, the first data further carries identification information of the user equipment. The transmitter 730 is specifically configured to send, to the user equipment through the second channel, the second data that further carries the identification information, so that the user equipment determines, based on the identification information in the second data, that the feedback information is information fed back by the base station for the first data.

Preferably, the processor 720 is specifically configured to scramble the second data by using the identification information, so that the second data further carries the identification information.

Preferably, the identification information includes one or more of the following information: a non-access stratum identifier NAS ID, a group-radio network temporary identifier G-RNTI, radio network temporary identifier information C-RNTI unique to the user equipment within a range of one or more cells, and an intra-group index.

Specifically, the processor 720 may scramble the feedback information of the UE by using the G-RNTI and the intra-group index, or may scramble the feedback information of the UE by using the C-RNTI, or may scramble the feedback information of the UE by using the intra-group index, or the like.

It may be understood that FIG. 7 shows only a simplified design of the base station. In actual application, the base station may include any quantity of transmitters, receivers, processors, controllers, memories, and the like, and all base stations that can implement the present disclosure fall within the protection scope of the present disclosure.

The controller/processor configured to perform functions of the foregoing user equipment or base station of the present disclosure may be a central processing unit (CPU), a general purpose processor, a digital signal processor (DSP), an application-specific integrated circuit (ASIC), a field programmable gate array (FPGA) or another programmable logical device, a transistor logical device, a hardware component, or any combination thereof. The controller/processor may implement or execute various examples of logical blocks, modules, and circuits described with reference to the content disclosed in the present disclosure. Alternatively, the processor may be a combination of processors implementing a computing function, for example, a combination of one or more microprocessors, or a combination of the DSP and a microprocessor.

Therefore, according to the foregoing base station and user equipment, the base station determines a feedback channel resource based on the DMRS selected by the UE and an uplink resource, so that a quantity of UEs can be flexibly supported while resource utilization is ensured. The base station scrambles the feedback information of the UE by using the identifier of the UE, so that feedback information of a plurality of UEs can be distinguished from each other.

Figure 8:
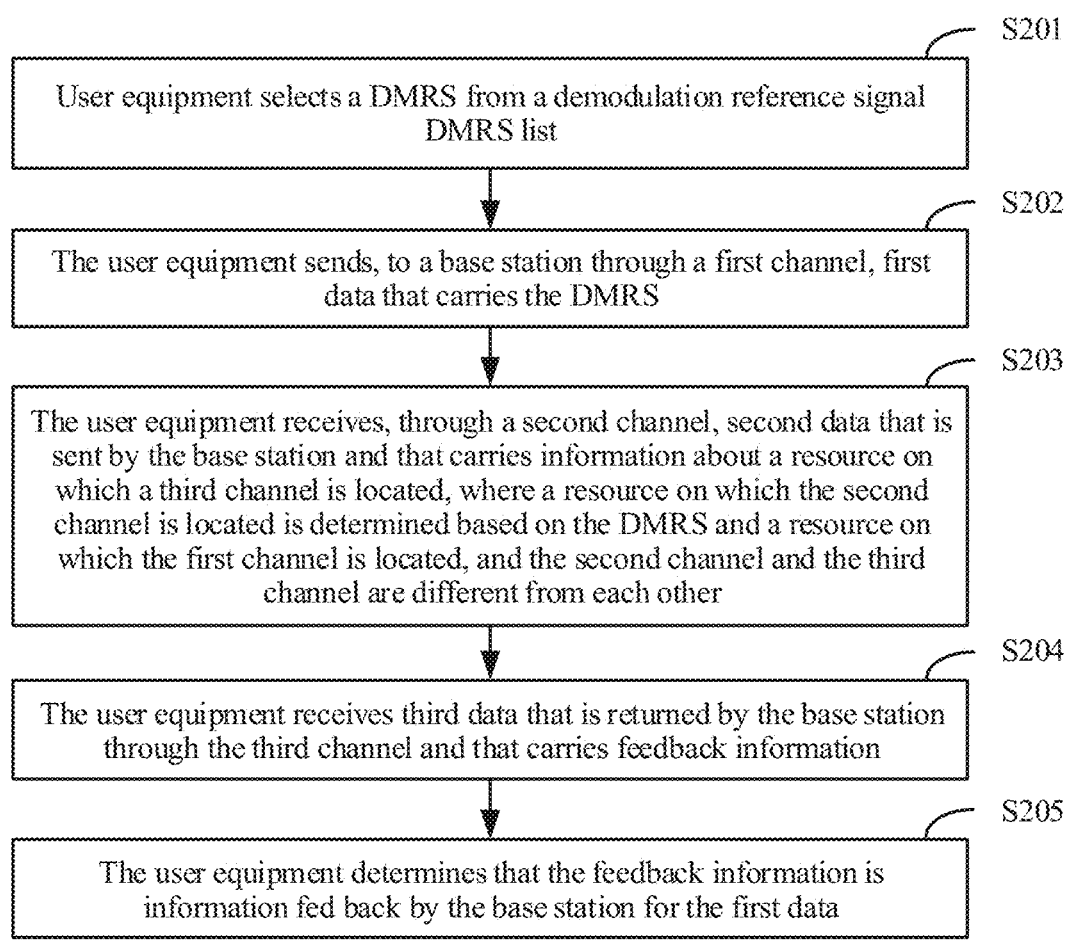
FIG. 8 is a flowchart of another communication method according to an embodiment of the present disclosure.

The solutions provided in the embodiments of the present disclosure are described in detail below with reference to FIG. 8. FIG. 8 is a flowchart of another communication method according to an embodiment of the present disclosure. In this embodiment of the present disclosure, the method is performed by UE. As shown in FIG. 8, the embodiment includes the following steps.

Step S201. The user equipment selects a DMRS from a demodulation reference signal DMRS list.

Preferably, the user equipment randomly selects a DMRS from the DMRS list; or the user equipment selects a DMRS from the DMRS list based on identification information of the user equipment.

Step S202. The user equipment sends, to a base station through a first channel, first data that carries the DMRS.

Preferably, the first data further carries identification information of the user equipment.

Preferably, the identification information includes one or more of the following information: a NAS ID, a G-RNTI, a C-RNTI, and an intra-group index.

Step S203. The user equipment receives, through a second channel, second data that is sent by the base station and that carries information about a resource on which a third channel is located, where a resource on which the second channel is located is determined based on the DMRS and a resource on which the first channel is located, and the second channel and the third channel are different from each other.

It should be noted that the second channel may be used to directly carry feedback information, and is a data channel. Alternatively, the second channel may be used to carry resource information indicating a third channel on which feedback information is located, and is a control channel. In other words, in this embodiment of the present disclosure, the control channel may send, to the user equipment, the resource information of the channel that carries the feedback information, so that feedback channels of different UEs or different groups of UEs are distinguished from each other.

In an example, the base station may indicate a UE ID and resource information of a PDSCH channel by using a PDCCH. The base station sends the feedback information to the UE through the PDSCH channel.

Preferably, the first data further carries the UE ID, and the second data further carries the UE ID, so that the UE determines, based on the UE ID in the second data, that the third channel is a channel used by the base station to send the feedback information to the UE.

The second data further carries the UE ID, so that information feedback channels of different UEs or different groups of UEs are distinguished from each other.

Preferably, that the second data further carries the identification information is specifically: scrambling the second data by using the identification information.

Specifically, UEs may be grouped, and the group of UEs has one identifier. In the second data sent by the base station to the UE through the PDCCH, resource information of the PDSCH that carries feedback information of the group of UEs is scrambled by using a UE G-RNTI. After receiving the second data, the UE performs descrambling by using the UE G-RNTI, and determines a resource of the PDSCH channel that carries the feedback information of the group of UEs.

S204. The user equipment receives third data that is returned by the base station through the third channel and that carries feedback information.

Step S205. The user equipment determines that the feedback information is information fed back by the base station for the first data.

Preferably, the third data further carries the UE ID, so that the user equipment determines, based on the UE ID in the third data, that the feedback information is the information fed back by the base station for the first data.

It may be understood that herein, that the third data further carries the UE ID is specifically: scrambling the second data by using the UE ID.

It may be understood that herein, the feedback information of the UE may be scrambled by using one or more identifiers in the UE ID. For example, the feedback information is scrambled by using the C-RNTI.

Further, for the PDSCH channel, optionally, an unscrambled part of the PDSCH channel is used to indicate whether some content is scrambled by using the UE ID. In other words, the third data may further carry information that indicates whether the third data carries the UE ID.

Preferably, the first data further carries a sequence number of the first data, and the third data further carries the sequence number, so that the user equipment determines, based on the identification information and the sequence number that are in the third data, that the feedback information is the information fed back by the base station for the first data.

Specifically, the first data may be transmitted at a layer such as a MAC layer, a Radio Link Control (RLC) layer, or a Packet Data Convergence Protocol (PDCP) layer. Therefore, the sequence number of the first data may be a sequence number of a data packet of the first data at a layer such as the MAC layer, the RLC layer, or the PDCP layer.

Specifically, data sent by the UE to the base station carries a sequence number of the data, and feedback information returned by the base station carries the corresponding sequence number, so that different data sent by the UE to the base station is distinguished from each other.

According to the communication method provided in this embodiment of the present disclosure, the downlink resource is related to uplink resource information and the DRMS. The user equipment may randomly select a DRMS, so that a quantity of UEs can be flexibly supported while resource utilization is ensured. The base station sends, to the UE, resource information of a channel on which the feedback information of the UE is located, and scrambles, by using the UE ID, the resource information of the channel on which the feedback information of the UE is located, so that feedback information channels of different UEs or different groups of UEs can be distinguished from each other. In addition, for a channel used by the UE to receive the feedback information, the feedback information of the UE is scrambled by using the UE ID, so that feedback information of different UEs is distinguished from each other. Further, the sequence number of the corresponding data may be carried in the feedback information for the data sent by the UE, so that feedback information for different data sent by the UE is distinguished from each other.

In addition, the communication method provided in this embodiment of the present disclosure may be performed by a base station. Specific steps are as follows: The base station receives, through a first channel, first data that is sent by user equipment and that carries a demodulation reference signal DMRS, where a resource of the first channel is one of one or more resources configured by a network for the user equipment. The base station determines a second channel based on the DMRS and the resource of the first channel. The base station sends, to the user equipment through the second channel, second data that carries resource information of a third channel. The base station sends, to the user equipment through the third channel, third data that carries feedback information that is sent by the base station for the first data.

Preferably, the first data further carries identification information of the user equipment, and the second data further carries the identification information, so that the user equipment determines, based on the identification information in the second data, that the third channel is a channel used by the base station to send the feedback information to the user equipment.

Preferably, the third data further carries the identification information, so that the user equipment determines, based on the identification information in the third data, that the feedback information is information fed back by the base station for the first data.

According to the communication method provided in this embodiment of the present disclosure, the UE randomly selects a DMRS, feedback channels of different UEs or different groups of UEs are distinguished from each other by using control channels, and the feedback information of the UE is scrambled by using a UE ID. Each method described in the foregoing embodiment is a method in which feedback information of different UEs can be distinguished from each other while resource utilization is ensured.

Figure 9:
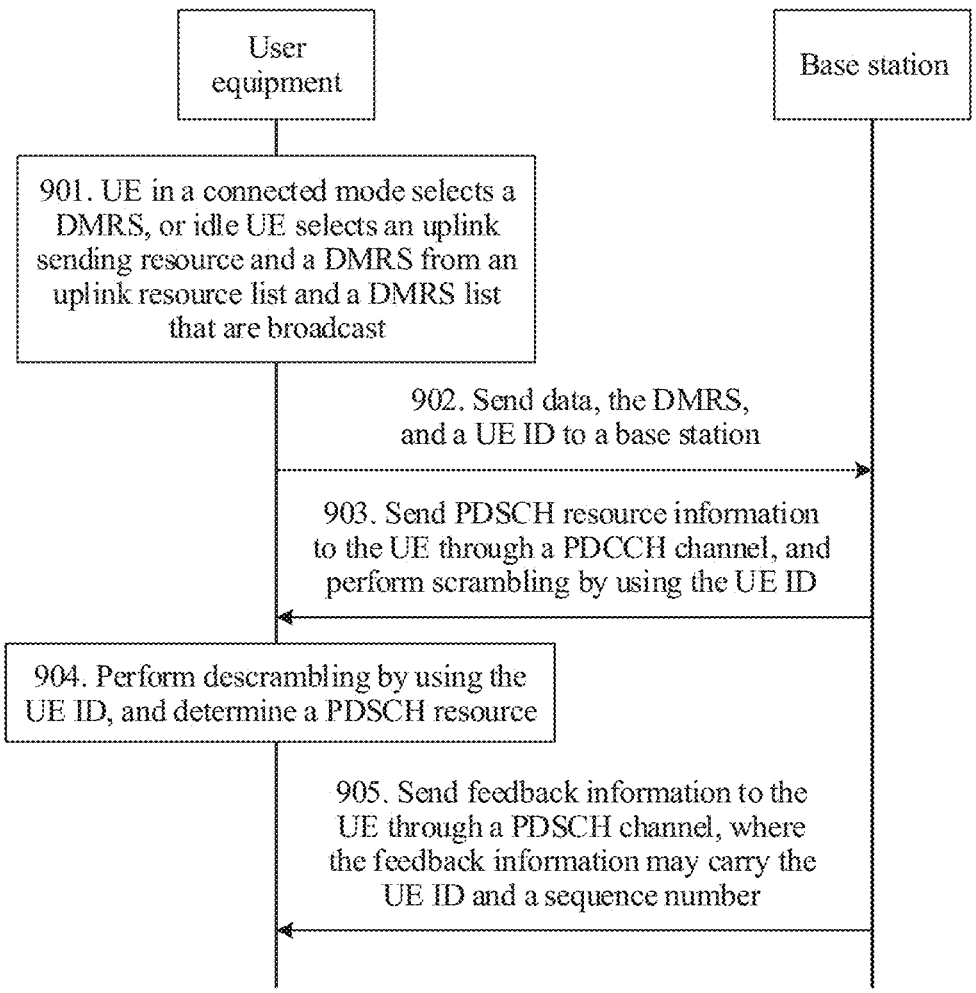
FIG. 9 is a diagram of signaling exchange in another communication method according to an embodiment of the present disclosure.

Correspondingly, an embodiment of the present disclosure provides a diagram of signaling exchange in another communication method, to describe the foregoing communication method in a signaling exchange manner, as shown in FIG. 9.

Step 901. UE in a connected mode selects a DMRS, or idle UE selects an uplink sending resource and a DMRS from an uplink resource list and a DMRS list that are broadcast.

It should be noted that before step 901, a network configures unique identifiers related to the UE. These unique identifiers are collectively referred to as a UE ID. A specific description in which a network of UE in a connected mode, UE in an idle mode, or UE with connected discontinuous reception or in an inactive mode configures a unique identifier for the UE is provided in detail in step 301, and details are not described herein again.

In an example, an uplink resource group list that is not sent through scheduling is indicated for the idle UE by using a broadcast, the UE selects a resource for sending, and the network determines a resource group ID based on the resource. A unique ID that is of the UE and that is indicated during uplink sending may be a UE ID allocated by a radio access network (RAN) or a core network (CN).

In another example, for the UE in the connected mode, a plurality of UEs are configured to share one resource group, and a group RNTI (G-RNTI) and/or an intra-group index of the UE is indicated.

Step 902. The UE sends data, the DMRS, and information about a UE ID to a base station.

Step 903. The base station sends PDSCH resource information to the UE through a PDCCH channel, and performs scrambling by using the UE ID.

Optionally, the UE/network determines, based on uplink resource group information and the DMRS, a resource location of a control channel PDCCH used to indicate feedback information. DMRS information is broadcast by the network to the UE, and during uplink sending, the UE randomly selects a DMRS or selects a DMRS based on the UE ID.

Step 904. The UE performs descrambling by using the UE ID, and determines a PSDCH resource on which feedback information of the UE is located.

Specifically, scrambling is performed by using the UE ID, to further distinguish between control channel PDCCHs of UE, and further distinguish between feedback channel PSDCHs of the UEs. For example, scrambling is performed by using the G-RNTI, to distinguish between feedback channel PSDCHs of different groups of UEs; and scrambling is performed by using a C-RNTI, to distinguish between feedback channel PSDCHs of different UEs.

Step 905. The base station sends the feedback information to the UE through a PDSCH channel, where the feedback information may carry the UE ID and a sequence number of data of the UE.

In an example, for UE in an idle mode, the base station indicates, on the PDCCH, a group ID and resource information of a PDSCH, and the PDSCH carries a UE ID of uplink data that is successfully received (ACK feedback information), or a UE ID and an ACK or NCK.

In another example, for UE in an idle mode, the UE sends data and a UE ID on a shared resource, for example, an intra-group identifier, a unique RNTI identifier of an air interface, or a group identifier (G-RNTI). The base station indicates, on the PDCCH, resource information of a PDSCH, scrambles the PDCCH by using the group identifier G-RNTI, and indicates, on the PDSCH, a receiving status ACK or NCK of the UE. Specific content may be an intra-group index and an ACK/NACK. Alternatively, feedback information of the UE is carried in a bitmap form, and a location of the UE in a bitmap is determined based on the UE ID. For example, 0/1 indicates a NCK/ACK.

In an optional manner, if a unique RNTI identifier of an air interface is carried when the UE sends the data, the PDCCH may be scrambled by using the unique RNTI identifier of the air interface, to perform feedback for only one UE. Optionally, specific feedback information ACK/NACK may be carried by indicating the PDSCH.

Specifically, if a group identifier and an uplink resource are mapped in a one-to-one manner, the base station may determine a group identifier based on an uplink resource. Therefore, the group identifier may not be carried during the uplink sending of the UE, and the network determines the group identifier based on an uplink resource on which the data is received.

According to the communication method provided in this embodiment of the present disclosure, the base station indicates, on the PDCCH, the resource information of the PDSCH, scrambles the PDCCH by using the group identifier G-RNTI, and indicates the receiving status ACK or NCK of the UE on the PDSCH. Feedback information of different UEs can be distinguished from each other while resource utilization is ensured.

Figure 10:
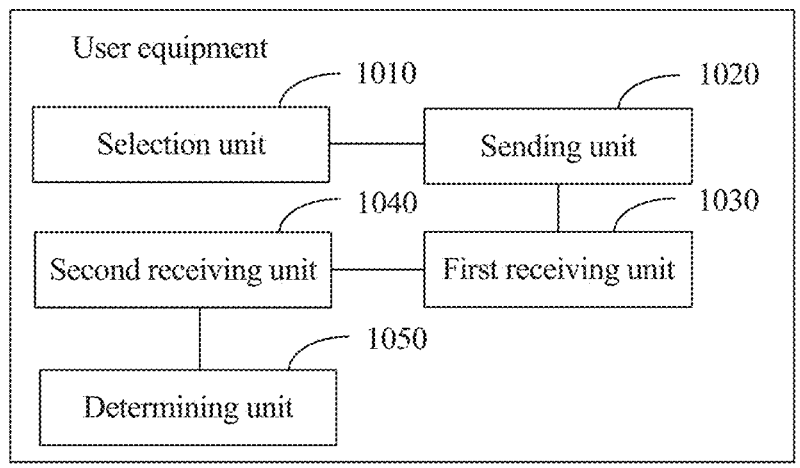
FIG. 10 is a schematic structural diagram of still another user equipment according to an embodiment of the present disclosure.

Correspondingly, an embodiment of the present disclosure further provides another user equipment, to implement the foregoing communication method. As shown in FIG. 10, the user equipment includes a selection unit 1010, a sending unit 1020, a first receiving unit 1030, a second receiving unit 1040, and a determining unit 1050.

The selection unit 1010 is configured to select a DMRS from a demodulation reference signal DMRS list.

The sending unit 1020 is configured to send, to a base station through a first channel, first data that carries the DMRS.

The first receiving unit 1030 is configured to receive, through a second channel, second data that is sent by the base station and that carries information about a resource on which a third channel is located, where a resource on which the second channel is located is determined based on the DMRS and a resource on which the first channel is located.

The second receiving unit 1040 is configured to receive third data that is returned by the base station through the third channel and that carries feedback information.

In another embodiment of the present disclosure, the first receiving unit 1030 and the second receiving unit 1040 may be integrated together.

The determining unit 1050 is configured to determine that the feedback information is information fed back by the base station for the first data.

Preferably, the selection unit 1010 is specifically configured to randomly select a DMRS from the DMRS list; or select a DMRS from the DMRS list based on identification information of the user equipment.

Preferably, the first data further carries identification information of the user equipment, and the second data further carries the identification information. The second receiving unit 1040 is specifically configured to determine, based on the identification information in the second data, that the third channel is a channel used by the base station to send the feedback information to the user equipment.

Preferably, the third data further carries the identification information. The determining unit 1050 is specifically configured to determine, based on the identification information in the third data, that the feedback information is the information fed back by the base station for the first data.

Figure 11:
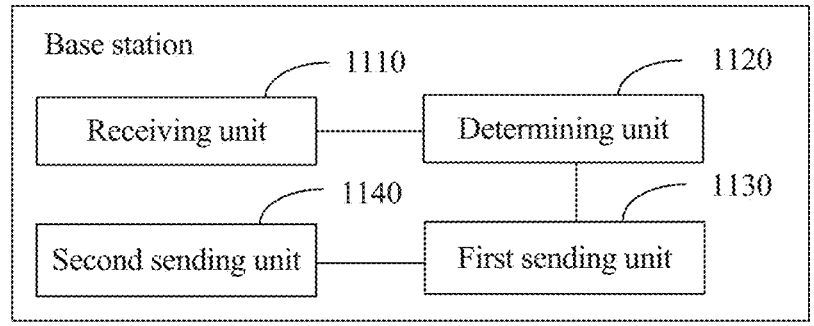
FIG. 11 is a schematic structural diagram of still another base station according to an embodiment of the present disclosure.

Correspondingly, an embodiment of the present disclosure further provides another base station, to implement the foregoing communication method. As shown in FIG. 11, the base station includes a receiving unit 1110, a determining unit 1120, a first sending unit 1130, and a second sending unit 1140.

The receiving unit 1110 is configured to receive, through a first channel, first data that is sent by user equipment and that carries a demodulation reference signal DMRS.

The determining unit 1120 is configured to determine, based on the DMRS and a resource on which the first channel is located, a resource on which a second channel is located.

The first sending unit 1130 is configured to send, to the user equipment through the second channel, second data that carries information about a resource on which a third channel is located.

The second sending unit 1140 is configured to send, to the user equipment through the third channel, third data that carries feedback information that is sent by the base station for the first data.

In another embodiment of the present disclosure, the first sending unit 1130 and the second sending unit 1140 may be integrated together.

Preferably, the first data further carries identification information of the user equipment, and the first sending unit 1130 is specifically configured to send, to the user equipment through the second channel, the second data that further carries the identification information, so that the user equipment determines, based on the identification information in the second data, that the third channel is a channel used by the base station to send the feedback information to the user equipment.

Preferably, the second sending unit 1140 is specifically configured to send, to the user equipment through the third channel, the third data that further carries the identification information, so that the user equipment determines, based on the identification information in the third data, that the feedback information is information fed back by the base station for the first data.

Figure 12:
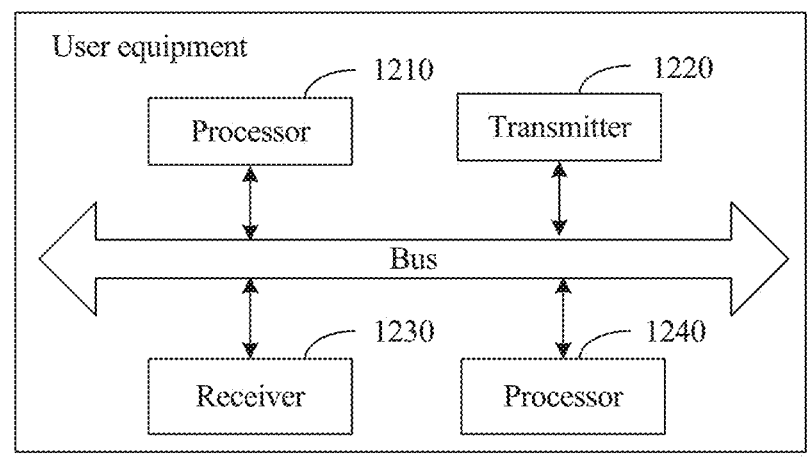
FIG. 12 is a schematic structural diagram of yet another user equipment according to an embodiment of the present disclosure.

In addition, the another user equipment provided in the embodiment of the present disclosure may further use the following implementation, to implement the communication method in the foregoing embodiment of the present disclosure. As shown in FIG. 12, the user equipment includes a processor 1210, a transmitter 1220, a receiver 1230, and a memory 1240.

The processor 1210 is configured to select a DMRS from a demodulation reference signal DMRS list.

The transmitter 1220 is configured to send, to a base station through a first channel, first data that carries the DMRS.

The receiver 1230 is configured to receive, through a second channel, second data that is sent by the base station and that carries information about a resource on which a third channel is located, where a resource on which the second channel is located is determined based on the DMRS and a resource on which the first channel is located.

The receiver 1230 is further configured to receive third data that is returned by the base station through the third channel and that carries feedback information.

The processor 1210 is further configured to determine that the feedback information is information fed back by the base station for the first data.

The memory 1240 is configured to store data, a program, and protocol information, and the processor 1210 runs the program in the memory 1240 to perform the communication method shown in FIG. 8 or FIG. 9.

Preferably, the processor 1210 is specifically configured to randomly select a DMRS from the DMRS list; or select a DMRS from the DMRS list based on identification information of the user equipment.

Specifically, the processor 1210 selects a DMRS from the DMRS list based on the identification information of the user equipment. A DMRS is selected based on a value obtained after a modulo operation is performed on an identifier of the user equipment. The value obtained after a modulo operation is performed on the identifier of the user equipment is N, and N is a positive integer. There is a preset correspondence between N and a DMRS. The correspondence may be a one-to-one correspondence, or may be a one-to-many correspondence. In addition, if N corresponds to many DMRSs, the user equipment randomly selects a DMRS from the DMRSs corresponding to the value N obtained after a modulo operation is performed on the identifier of the user equipment.

Preferably, the first data further carries identification information of the user equipment, and the second data further carries the identification information. The processor 1210 is specifically configured to determine, based on the identification information in the second data, that the third channel is a channel used by the base station to send the feedback information to the user equipment.

Preferably, the third data further carries the identification information, and the processor 1210 is specifically configured to determine, based on the identification information in the third data, that the feedback information is the information fed back by the base station for the first data.

It may be understood that FIG. 12 shows only a simplified design of the user equipment. In actual application, the user equipment may include any quantity of transmitters, receivers, processors, controllers, memories, and the like, and all base stations that can implement the present disclosure fall within the protection scope of the present disclosure.

Figure 13:
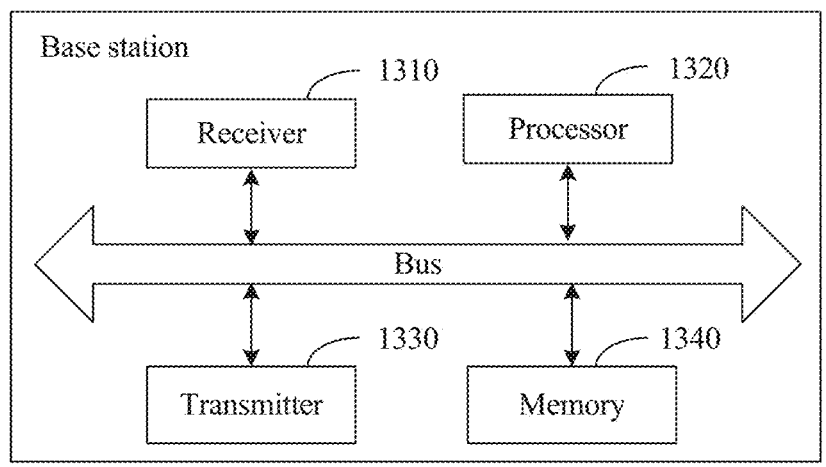
FIG. 13 is a schematic structural diagram of yet another base station according to an embodiment of the present disclosure.

In addition, the another base station provided in the embodiment of the present disclosure may further use the following implementation, to implement the communication method in the foregoing embodiment of the present disclosure. As shown in FIG. 13, the base station includes a receiver 1310, a processor 1320, a transmitter 1330, and a memory 1340.

The receiver 1310 is configured to receive, through a first channel, first data that is sent by user equipment and that carries a demodulation reference signal DMRS.

The processor 1320 is configured to determine, based on the DMRS and a resource on which the first channel is located, a resource on which a second channel is located.

The transmitter 1330 is configured to send, to the user equipment through the second channel, second data that carries information about a resource on which a third channel is located.

The transmitter 1330 is further configured to send, to the user equipment through the third channel, third data that carries feedback information that is sent by the base station for the first data.

The memory 1340 is configured to store data, a program, and protocol information, and the processor 1320 runs the program in the memory 1340 to perform the communication method shown in FIG. 8 or FIG. 9.

Preferably, the first data further carries identification information of the user equipment, and the transmitter 1330 is specifically configured to send, to the user equipment through the second channel, the second data that further carries the identification information, so that the user equipment determines, based on the identification information in the second data, that the third channel is a channel used by the base station to send the feedback information to the user equipment.

Preferably, the transmitter 1330 is specifically configured to send, to the user equipment through the third channel, the third data that further carries the identification information, so that the user equipment determines, based on the identification information in the third data, that the feedback information is information fed back by the base station for the first data.

Preferably, the processor 1320 is specifically configured to scramble the second data by using the identification information, so that the second data further carries the identification information.

Preferably, the identification information includes one or more of the following information: a non-access stratum identifier NAS ID, a group-radio network temporary identifier G-RNTI, radio network temporary identifier information C-RNTI unique to the user equipment within a range of one or more cells, and an intra-group index.

Specifically, the processor 1320 may scramble the feedback information of the UE by using the G-RNTI and the intra-group index, or may scramble the feedback information of the UE by using the C-RNTI, or may scramble the feedback information of the UE by using the intra-group index, or the like.

It may be understood that FIG. 13 shows only a simplified design of the base station. In actual application, the base station may include any quantity of transmitters, receivers, processors, controllers, memories, and the like, and all base stations that can implement the present disclosure fall within the protection scope of the present disclosure.

The controller/processor configured to perform functions of the foregoing user equipment or base station of the present disclosure may be a central processing unit (CPU), a general purpose processor, a digital signal processor (DSP), an application-specific integrated circuit (ASIC), a field programmable gate array (FPGA) or another programmable logical device, a transistor logical device, a hardware component, or any combination thereof. The controller/processor may implement or execute various examples of logical blocks, modules, and circuits described with reference to the content disclosed in the present disclosure.

Alternatively, the processor may be a combination of processors implementing a computing function, for example, a combination of one or more microprocessors, or a combination of the DSP and a microprocessor.

Therefore, according to the foregoing user equipment and base station, the base station determines a feedback channel resource based on the DMRS selected by the UE and an uplink resource, so that a quantity of UEs can be flexibly supported while resource utilization is ensured. The UE randomly selects a DMRS, and scrambles the feedback information of the UE by using a UE ID. In addition, feedback channel PDSCHs of different UEs or different groups of UEs may be distinguished from each other by using control channel PDCCHs, so that feedback information of different UEs can be distinguished from each other.

It should be noted that an embodiment of the present disclosure provides a flowchart of still another communication method. In this embodiment of the present disclosure, the method is performed by UE.

Step S301. A network allocates, to the UE, a resource of a dedicated feedback channel that is used to carry information fed back by the base station for the UE.

Optionally, the resource of the feedback channel is a downlink feedback resource used by the UE to perform uplink sending without scheduling.

Step S302. The UE sends data to the base station.

Step S303. The base station sends feedback information to the UE through the feedback channel.

Specifically, the network allocates a dedicated PHICH resource to each UE in a connected mode, an inactive mode, or an idle mode, to carry a downlink feedback sent by the base station to the UE. The feedback information includes only ACK or NCK information, and occupies very few resources, and a resource allocation granularity is smaller than an allocation granularity in an LTE system. Because the resource is dedicated to each UE, an identifier of the UE does not need to be additionally indicated, and very low overheads are needed. If a feedback resource of each UE is unique within a range of one cell, when the UE is changed to another cell, the network is informed, and the network determines whether the resource is allocated to another user, and re-allocates a resource to the UE if the resource is allocated to another user. If a feedback resource of each UE is unique within a range of a plurality of cells, when the UE moves out of the specified range, the network is informed, and the network determines whether the resource is allocated to another user, and re-allocates a resource to the UE if the resource is allocated to another user.

Preferably, the resource of channel has a preset time. When the channel is configured for the UE for a time exceeding the preset time, the UE releases resource of the channel, and the network allocates a resource of a next channel to the UE. Alternatively, the network releases the resource of the channel if the network does not receive indication information of the channel within the preset time.

Optionally, the resource may have a specific validity time, and the UE may release the resource after the validity time for allocating the resource expires. Likewise, the feedback resource is also managed on a network side based on the validity time. Optionally, when the validity time expires, the UE may notify the network of whether to continue to use the feedback resource. For example, the UE periodically sends an indication request to the network, and the network determines, based on whether the UE receives the periodic indication request, whether to release the feedback resource. If no indication request from the UE is received after the period ends, the network may release the feedback resource.

Specifically, after releasing the resource, the UE may or may not notify the network that the UE has released the resource. The UE may indicate, at next uplink sending, to the network that the UE has released a dedicated feedback resource, and the network notifies the UE of a new dedicated feedback resource.

According to the communication method provided in this embodiment of the present disclosure, the network allocates a dedicated feedback channel resource to the UE, to carry the downlink feedback sent by the base station to the UE. The feedback information includes only the ACK or NCK information, and occupies very few resources, and the resource allocation granularity is smaller than the allocation granularity in the LTE system. Because the resource is dedicated to each UE, the identifier of the UE does not need to be additionally indicated, and low overheads are needed. The validity time is preset. Therefore, it is convenient for the UE or the network to manage the dedicated feedback channel resource, thereby improving practicability of the communication method.

A person skilled in the art should be aware that in the foregoing one or more examples, functions described in the present disclosure may be implemented by hardware, software, firmware, or any combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of the present disclosure are further described in detail in the foregoing specific embodiments. It should be understood that the foregoing descriptions are merely specific embodiments of the present disclosure, but are not intended to limit the protection scope of the present disclosure. Any modification, equivalent replacement, or improvement made on the basis of the technical solutions of the present disclosure shall fall within the protection scope of the present disclosure.

What is claimed is:

1. A communication method, comprising:
    selecting, by user equipment, a demodulation reference signal (DMRS) from a DMRS list;
    sending, by the user equipment to a base station through a first channel, first data that carries the DMRS;
    receiving, by the user equipment through a second channel, second data that is sent by the base station and that carries feedback information, wherein a resource on which the second channel is located is determined based on the DMRS and a resource on which the first channel is located; and
    determining, by the user equipment, that the feedback information is information fed back by the base station for the first data.

2. The method according to claim 1, wherein selecting, by user equipment, a DMRS from a DMRS list comprises:
    randomly selecting, by the user equipment, a DMRS from the DMRS list; or
    selecting, by the user equipment, a DMRS from the DMRS list based on identification information of the user equipment.

3. The method according to claim 1, wherein:
the first data further carries identification information of the user equipment, and the second data further carries the identification information; and
determining, by the user equipment, that the feedback information is information fed back by the base station for the first data comprises:
   determining, by the user equipment based on the identification information in the second data, that the feedback information is the information fed back by the base station for the first data.

4. The method according to claim 3, wherein the second data is scrambled according to the identification information.

5. A communication method, comprising:
selecting, by user equipment, a demodulation reference signal (DMRS) from a DMRS list;
sending, by the user equipment to a base station through a first channel, first data that carries the DMRS;
receiving, by the user equipment through a second channel, second data that is sent by the base station and that carries information about a resource on which a third channel is located, wherein a resource on which the second channel is located is determined based on the DMRS and a resource on which the first channel is located, and the second channel and the third channel are different from each other;
receiving, by the user equipment through the third channel, third data that is sent by the base station and that carries feedback information; and
determining, by the user equipment, that the feedback information is information fed back by the base station for the first data.

6. The method according to claim 5, wherein selecting, by user equipment, a DMRS from a DMRS list comprises:
randomly selecting, by the user equipment, a DMRS from the DMRS list; or
selecting, by the user equipment, a DMRS from the DMRS list based on identification information of the user equipment.

7. The method according to claim 5, wherein:
the first data further carries identification information of the user equipment, and the second data further carries the identification information; and
before receiving, by the user equipment through the third channel, third data that is sent by the base station and that carries feedback information, the method further comprises:
   determining, by the user equipment based on the identification information in the second data, that the third channel is a channel used by the base station to send the feedback information to the user equipment.

8. User equipment, comprising:
a processor, configured to select a demodulation reference signal (DMRS) from a DMRS list;
a transmitter, configured to send, to a base station through a first channel, first data that carries the DMRS;
a receiver, configured to receive, through a second channel, second data that is sent by the base station and that carries feedback information, wherein a resource on which the second channel is located is determined based on the DMRS and a resource on which the first channel is located; and
wherein the processor is further configured to determine that the feedback information is information fed back by the base station for the first data.

9. The user equipment according to claim 8, wherein the processor is configured to:
randomly select a DMRS from the DMRS list; or
select a DMRS from the DMRS list based on identification information of the user equipment.

10. The user equipment according to claim 8, wherein:
the first data further carries identification information of the user equipment, and the second data further carries the identification information; and
the processor is configured to determine, based on the identification information in the second data, that the feedback information is the information fed back by the base station for the first data.

* * * * *